US011142032B2

(12) United States Patent
Wallgren

(10) Patent No.: US 11,142,032 B2
(45) Date of Patent: Oct. 12, 2021

(54) WHEEL SUSPENSION

(71) Applicant: ZF Friedrichshafen AG, Friedrichshafen (DE)

(72) Inventor: Klaus Wallgren, Karlsfeld (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 143 days.

(21) Appl. No.: 16/462,293

(22) PCT Filed: Oct. 16, 2017

(86) PCT No.: PCT/EP2017/076279
§ 371 (c)(1),
(2) Date: May 20, 2019

(87) PCT Pub. No.: WO2018/095656
PCT Pub. Date: May 31, 2018

(65) Prior Publication Data
US 2019/0315172 A1    Oct. 17, 2019

(30) Foreign Application Priority Data

Nov. 22, 2016    (DE) .................... 10 2016 222 965.6

(51) Int. Cl.
*B60G 3/26*        (2006.01)
*B60G 7/00*        (2006.01)
*B62D 7/22*        (2006.01)

(52) U.S. Cl.
CPC ............. *B60G 3/265* (2013.01); *B60G 7/001* (2013.01); *B60G 7/008* (2013.01);
(Continued)

(58) Field of Classification Search
CPC .......... B60G 3/20; B60G 3/265; B60G 7/001; B60G 7/008; B60G 7/228; B60G 2200/17;
(Continued)

(56) References Cited

U.S. PATENT DOCUMENTS 4,828,279 A * 5/1989 Matschinsky ............ B60G 3/20
                                                    280/124.143
5,080,388 A * 1/1992 Berry ....................... B60G 3/20
                                                    280/124.136
(Continued)

FOREIGN PATENT DOCUMENTS

DE    38 43 613 A1    7/1990
DE    42 07 856 A1    9/1993
(Continued)

OTHER PUBLICATIONS

International Search Report Corresponding to PCT/EP2017/076279 dated Jan. 23, 2018.
(Continued)

*Primary Examiner* — Frank B Vanaman
(74) *Attorney, Agent, or Firm* — Finch & Maloney, PLLC; Michael J. Bujold; Jay S. Franklin

(57) ABSTRACT

A wheel suspension (1), for a motor vehicle, having a hub carrier (2) for holding a wheel (3), a wheel-guiding link (4) for an articulated connection of the hub carrier (2) to a body (6), and a steering rod (8) for steering the wheel (3). The hub carrier (2) and the wheel-guiding link (4), for steering the wheel (3), are pivotally connected to each other such that the hub carrier (2) can be swiveled about a steering axis relative to the wheel-guiding link (4). The hub carrier (2) is directly connected to the wheel-guiding link (4), in a first connection area (20), and the hub carrier (2) is indirectly coupled to the
(Continued)

wheel-guiding link (4), in a second connecting area (21), via an integral link (5) connected to a chassis element (12).

14 Claims, 7 Drawing Sheets

(52) U.S. Cl.
CPC .... *B60G 2200/17* (2013.01); *B60G 2200/422* (2013.01); *B60G 2200/44* (2013.01); *B60G 2204/129* (2013.01); *B60G 2204/422* (2013.01); *B60G 2206/121* (2013.01); *B62D 7/228* (2013.01)

(58) Field of Classification Search
CPC .......... B60G 2200/422; B60G 2200/44; B60G 2204/129; B60G 2204/422; B60G 2206/121; B60G 2200/143; B60G 2200/445
See application file for complete search history.

(56) References Cited

U.S. PATENT DOCUMENTS

| | | | | |
|---|---|---|---|---|
| 5,100,165 A | * | 3/1992 | Hespelt | B60G 3/20 280/124.141 |
| 5,697,633 A | * | 12/1997 | Lee | B60G 3/26 280/124.136 |
| 5,782,484 A | | 7/1998 | Kuhn, Jr. | |
| 5,992,868 A | * | 11/1999 | Orimoto | B60G 3/26 280/124.138 |
| 6,027,130 A | * | 2/2000 | Kawabe | B60G 3/265 280/124.135 |
| 6,123,351 A | * | 9/2000 | Bruehl | B60G 3/20 280/124.135 |
| 10,035,393 B2 | | 7/2018 | Wallgren | |
| 2003/0052467 A1 | * | 3/2003 | Allman | B60G 3/265 280/86.756 |

FOREIGN PATENT DOCUMENTS

| | | |
|---|---|---|
| DE | 10 2009 022 589 A1 | 12/2010 |
| DE | 10 2013 211 535 A1 | 12/2014 |
| EP | 0 323 815 A1 | 7/1989 |
| EP | 0 642 939 A1 | 3/1995 |
| EP | 1 958 797 A1 | 8/2008 |
| WO | 2015/104942 A1 | 7/2015 |
| WO | 2016/116294 A1 | 7/2016 |

OTHER PUBLICATIONS

Written Opinion Corresponding to PCT/EP2017/076279 dated Jan. 23, 2018.

* cited by examiner

WHEEL SUSPENSION

This application is a National Stage completion of PCT/EP2017/076279 filed Oct. 16, 2017, which claims priority from German patent application serial no. 10 2016 222 965.6 filed Nov. 22, 2016.

FIELD OF THE INVENTION

This invention relates to a wheel suspension for a motor.

BACKGROUND OF THE INVENTION

From EP 0 323 815 A1 a wheel suspension fora motor vehicle, which can be used in particular for a drivable, steerable rear axle, is known. A hub carrier, which holds a wheel that can be driven by a drive shaft, is pivotally connected to a wheel-guiding link for that purpose. The wheel-guiding link, consisting of a component largely extending in the longitudinal direction of the vehicle and an associated component, extending largely in the transverse direction of the vehicle, is pivotally connected to a body of the vehicle using two body-side bearings and in that way can perform height motions at the hub carrier end. In the context of this patent application, the term "body" shall be interpreted broadly, in particular, it also denotes both the body of the vehicle as well as firmly connected assemblies such as a cross member mounted to the body or comparable connection components.

In EP 0 323 815 A1, the wheel-guiding link and the hub carrier are articulated to one another via a ball joint in such a way that the hub carrier can be swiveled about a steering axis relative to the wheel-guiding link. The steering axis extends through exactly this ball joint and a joint point at an upper end of the hub carrier, in which the wheel is pivotally connected to a camber arm, the end of which facing away from the hub carrier in turn is articulated to the body of the vehicle. The steering axle of the hub carrier thus formed, extending through the lower and upper attachment point of the hub carrier can alter its position relative to the body of the vehicle depending on the compression state, i.e. it is a steering axle having a dynamic position relative to the vehicle body. To enable steering movements of the hub carrier about the steering axle thus formed, a tie link engages at a rear end of the hub carrier in the transverse direction of the vehicle. Due to the translatory movement of the tie link in the transverse direction of the vehicle, the wheel is set in steering motion, i.e. swiveled about the steering axis described above.

To support the hub carrier, in particular to the driving or deceleration forces or torques acting thereon, the hub carrier is coupled to the wheel-guiding link by an integral link in a rear area. For this purpose, a lower end of the integral link is pivotally connected to the wheel-guiding link, while an upper end of the integral link is pivotally connected to a rear end of the hub carrier. When performing steering movements, the upper end of the integral link is swiveled in the transverse direction of the vehicle.

From DE 10 2013 211 535 A1 a further suspension for a motor vehicle according to the features of the preamble of claim 1 is known. In contrast to EP 0 323 815 A1, in the concept described in DE 10 2013 211 535 A1, the integral link is arranged laterally of the wheel-guiding link within the wheel rim. This results in a favorable utilization of installation space. An upper end of the integral link is articulated to the hub carrier, an opposite lower end of the integral link is pivotally connected to the wheel-guiding link.

For damping the operational vibrations of the wheel-guiding link, it is connected to a lower end of a damper largely extending in the vertical direction of the vehicle. Separate connections for the integral link and the damper are formed on the respective wheel-guiding links.

SUMMARY OF THE INVENTION

This invention addresses the problem of providing a suspension of the type mentioned, in which the hub carrier is coupled to the wheel-guiding link in an improved manner in a second connection area. In this case, primarily a further improved utilization of installation space is to be created; in addition the option of improving the kinematic properties of the suspension is to be created. Rotation of the hub carrier naturally occurring in semitrailing link suspensions during compression of the spring due to an (unintentional) movement of the wheel in the vertical direction of the vehicle is to be reduced or totally eliminated in that way.

This problem is solved by a wheel suspension according to the independent claim(s). It is a suspension for a motor vehicle having a hub carrier for receiving a wheel, a wheel-guiding link for the pivotal connection of the hub carrier to a body and a steering means for steering the wheel. For steering a wheel, the hub carrier and the wheel-guiding link are pivotally connected to each other via a ball joint in such a way that the hub carrier can be swiveled about a steering axis relative to the wheel-guiding link. In a first connection area, the hub carrier is directly connected to the wheel-guiding link. According to the invention, the wheel suspension is characterized in that, in a second connection area, the hub carrier is indirectly coupled to the wheel-guiding link via an integral link connected to an element of the chassis.

As in the prior art according to DE 10 2013 211 535 A1, the hub carrier is indirectly coupled to the wheel-guiding link in a second connection area. In contrast to the previously known coupling, the solution according to the invention provides that the coupling is based on an integral link, which is connected to a chassis element. According to the invention, hub carriers and wheel-guiding links are accordingly not coupled directly (in the sense of "solely") via the integral link, but rather via a kinematic chain, which is formed by the integral link and a suspension element attached thereto. Depending on the function and kinematic connection of the suspension element, the coupling according to the invention can have a favorable influence on the kinematics of the suspension. The order within the kinematic chain is basically interchangeable.

According to a preferred embodiment of the invention, the integral link is connected to the chassis element by means of a first joint. In this case, according to a first preferred alternative, the suspension element is connected to the wheel-guiding link and the integral link is connected to the hub carrier by means of a second joint. According to a second preferred alternative, the suspension element is connected to the hub carrier and the integral link is connected to the wheel-guiding link by means of a second joint.

In both cases, no (further) connection for the integral link (first alternative) or the chassis element (second alternative) has to be provided on the wheel-guiding link. Accordingly, a space-saving design of the wheel-guiding link, in particular a shortened design of the wheel-guiding link can be implemented.

According to an advantageous embodiment of the wheel suspension, the chassis element, to which the integral link is connected, is a component connected to the body, in particular a damper or a spring-damper system for damping the vibrations of the wheel. By connecting the chassis element to the body of the vehicle, this advantageously assumes the function of a link, that is, the chassis element influences the position of the hub carrier. In the case of a damper or a spring-damper system, the chassis element is a variable-length ("telescoping") component. Movements of the chassis element due to the travel of the wheel always cause a tilting of the chassis element about the longitudinal axis of the vehicle. When the integral link is connected to the suspension element at a place located outside of the tilting axis, this results in a change in position of the lower connection point of the integral link at the chassis element depending on both the wheel travel and the tilt angle of the chassis element.

Advantageously, the integral link is pivotally connected to the chassis element in a coupling area, which is spaced further apart from the center of the vehicle than a coupling area for the pivotal connection of the chassis element to the wheel-guiding link. Based on the selection of suitable kinematics points, rotation of the hub carrier about the wheel center during compression or deflection of the wheel-guiding link can be reduced or even completely prevented.

In particular, if the suspension element is a damper or a spring-damper system, it advantageously extends largely in the vertical vehicle direction.

As stated above, the hub carrier having the wheel-guiding link according to the invention is directly connected in a first connection area and indirectly coupled in a second connection area. Advantageously, the two connection areas (first connection area and second connection area) are spaced apart from each other, in particular in the longitudinal direction of the vehicle.

Various arrangements and configurations of the connection areas are conceivable. In accordance with a preferred development of the wheel suspension, one of the two attachment areas, in particular the first attachment area, is formed in front of the wheel center and the other (then second attachment area) behind the wheel center. Please note that the first connection area can also be arranged close to or even behind the wheel center with respect to the longitudinal direction of the vehicle.

To achieve a steering angle that is approximately the same size on both sides, the integral link is advantageously aligned in the vertical direction of the vehicle in the unsteered state of the wheel.

According to a further advantageous development of the wheel suspension, the wheel-guiding link has an axis of rotation inclined in relation to the longitudinal axis of the vehicle, because the wheel-guiding link is attached to the body (of the vehicle) in two areas, in particular a front outer area and a rear inner area. The terms "front" and "rear" or "outer" and "inner" shall be interpreted in relation to the longitudinal direction of the vehicle or vehicle center. Thus, with respect to the vehicle's longitudinal direction and the vehicle center, the front outer area is located farther forward and farther outward than the rearward inner area. The oblique axis of rotation of the wheel-guiding link results in advantages in terms of installation space design.

Advantageously, a receptacle for a hub carrier bearing and a receptacle for a damper bearing are formed on the wheel-guiding link. The need for an additional receptacle for the integral link is eliminated by the invention because of the connection of the integral link to the chassis element.

The wheel suspension of the type described above can be designed in different ways. According to a preferred development, the wheel-guiding link is arranged in a lower link plane in relation to a vertical direction of the vehicle and a camber arm connecting the hub carrier to the body is arranged in a link plane above that.

The suspension can be designed to be actively or passively steerable. Accordingly, it is conceivable that the steering means is designed as a steering link for passive steering via the wheel travel. According to a preferred alternative, the steering means is designed for active steering using a steering actuator as a tie link.

An advantageous space design results from the integral link, the suspension element and a spring assigned to the wheel-guiding link being arranged approximately on a line preferably extending in the transverse direction of the vehicle in relation to the vertical direction of the vehicle in plan view. For example, the integral link, the suspension element and the spring can be arranged between the camber arm, possibly a drive shaft, and the tie link (active steering) in plan view. The suspension may be used to suspend a non-driven wheel or a driven wheel.

According to an advantageous development of the invention, the wheel can be driven via a shaft extending essentially in the transverse direction of the vehicle. It should be noted, however, that the described wheel suspension can be designed to achieve comparable effects and benefits for a non-drivable wheel, or for designs based on a wheel hub motor.

BRIEF DESCRIPTION OF THE DRAWINGS

Below, the invention is described with reference to embodiments shown in the drawings. In the drawings.

DETAILED DESCRIPTION OF THE PREFERRED EMBODIMENTS

Figure 1:
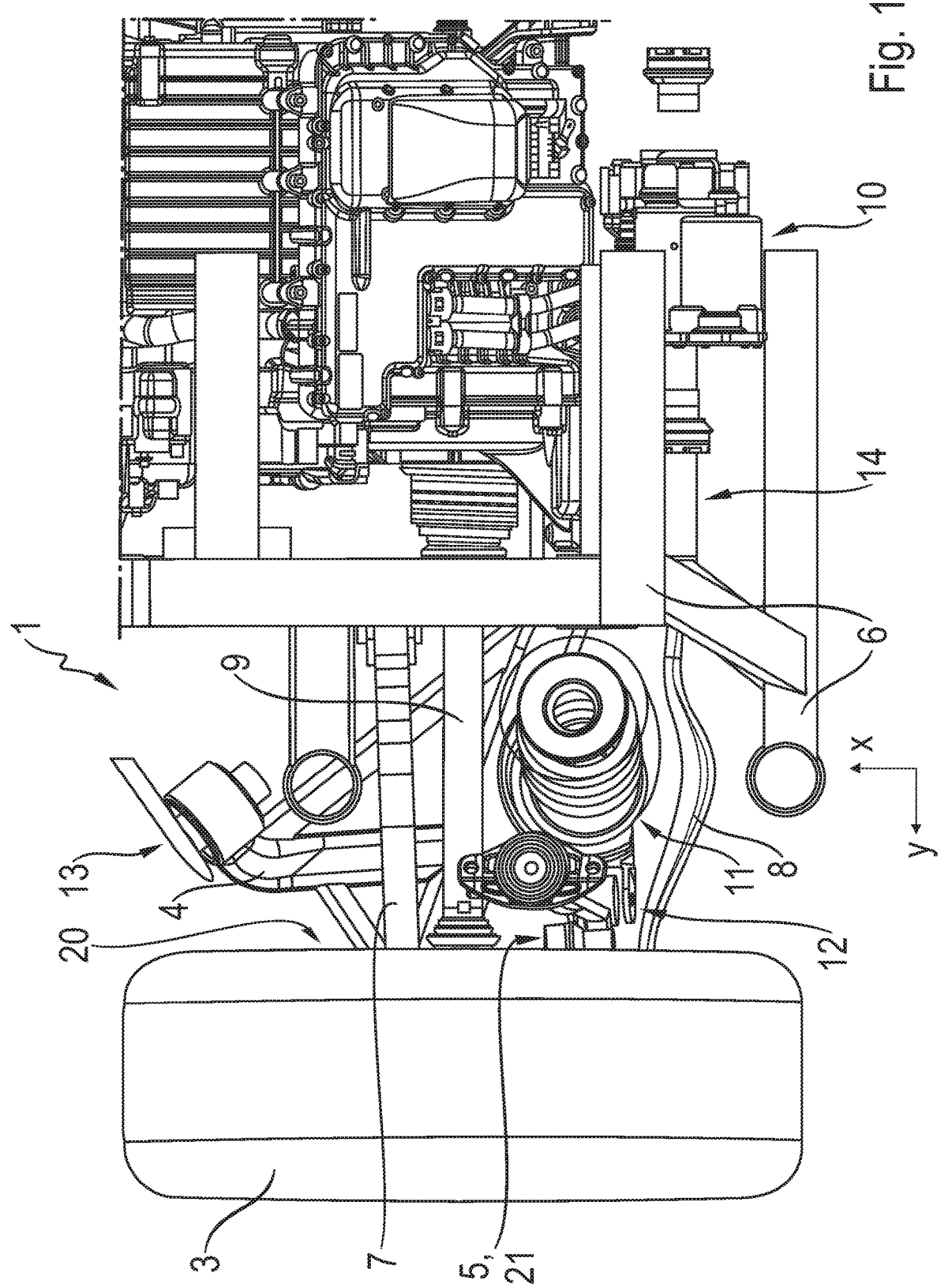
FIG. 1 shows a plan view of the suspension for a motor vehicle according to an exemplary embodiment of the invention.

FIGS. 1-6 in the drawing relate to a suspension according to a preferred embodiment of the invention. While FIGS. 1, 2, 3, 5, 6 show different views of the same suspension in the assembled state, FIG. 4 contains an individual depiction of a wheel-guiding link used for this wheel suspension. As all FIGS. 1 to 6 refer to the same exemplary embodiment, the same reference numerals are used for the same components in the various representations. Any explanations given in relation to individual components or with respect to the interaction and the functioning of the wheel suspension are thus applicable to all FIGS. 1 to 6. To avoid repetitions, reference is therefore made to the entire description of the embodiment of the invention.

To facilitate orientation, each of FIGS. 1 to 6 contains a coordinate system, which indicates the longitudinal direction of the vehicle x, the transverse direction of the vehicle y and the vertical direction of the vehicle z with respect to the respective representations. The longitudinal direction of the vehicle x corresponds to the forward direction of travel of the vehicle.

In FIGS. 1, 2, 3, 5 and 6, a wheel suspension 1 for a motor vehicle according to a first and only exemplary embodiment of the present invention is shown from different perspectives. Specifically, this is the wheel suspension of a rear wheel, in particular of a passenger car.

To this end, a wheel 3 is held by a hub carrier 2 and is rotatably mounted relative to the latter about a wheel axis. The wheel suspension 1 further comprises a wheel-guiding link 4 for a pivotal connection of the hub carrier 2 to a body 6. In the exemplary embodiment shown, the body 6 is a cross member. Because in the assembled state, the cross member 6 is firmly connected to a body of the vehicle, in the description of this invention, the cross member 6 is denoted by the term "body" in a simplifying manner. According to a conceivable alternative, the link 4 can be directly connected to the vehicle carriage (=body).

Figure 4:
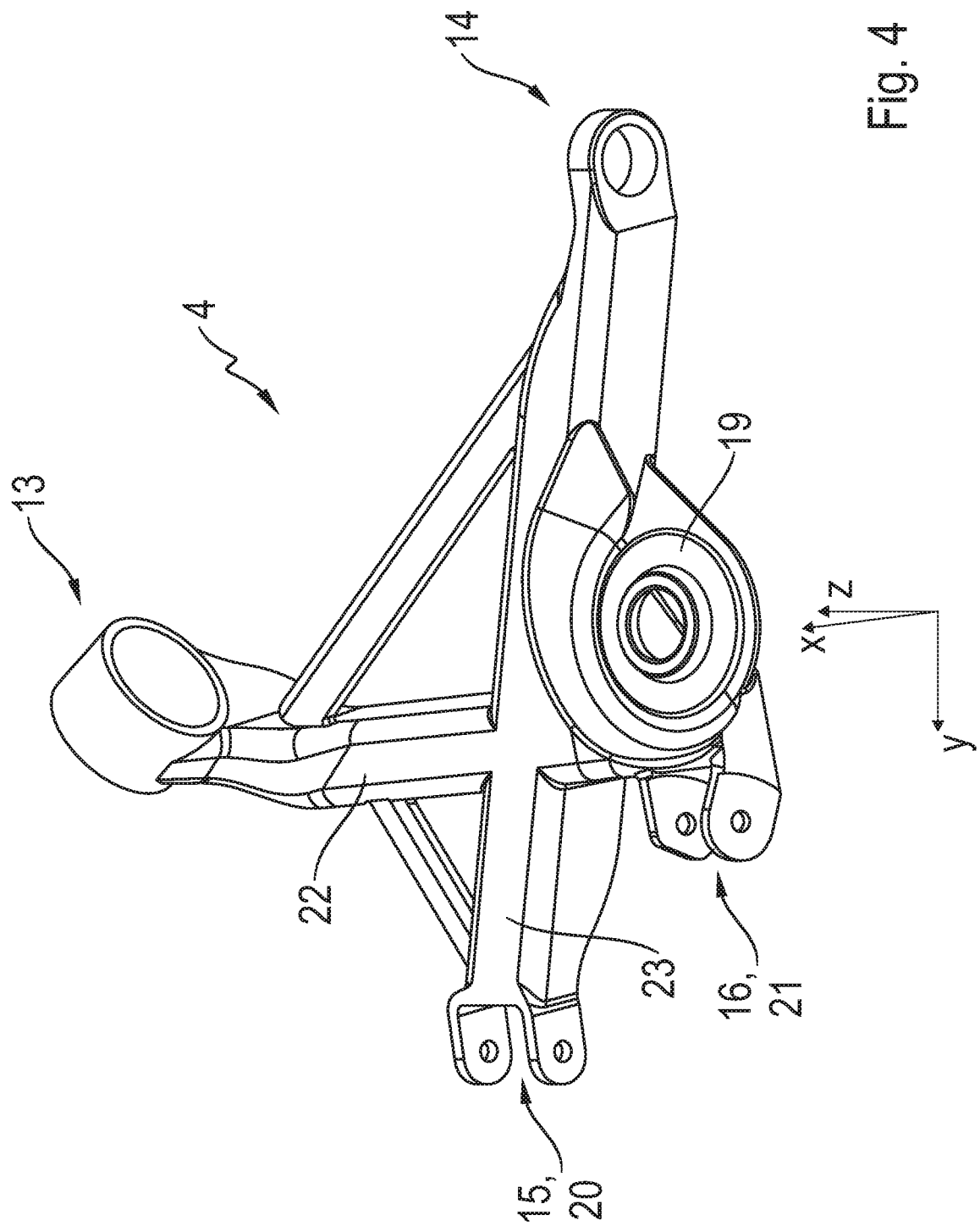
FIG. 4 shows a wheel-guiding link used in the wheel suspension shown above in an oblique top view.

The wheel-guiding link 4 is shown as a single component in FIG. 4. It is a component, which is essentially formed from two intersecting struts 22, 23. Of these, a longitudinal strut 22 extends substantially in the longitudinal direction of the vehicle x (between the front body-side bearing 13 and damper bearing 16), while a transverse strut 23 extends substantially in the transverse direction of the vehicle y (between the rear body-side bearing 14 and hub carrier bearing 15).

At the body-side end of the longitudinal strut 22, a front body-side bearing 13 is formed in the form of a sleeve, while at the body-side end of the cross member 23, a rear body-side bearing 14 is formed in the form of an end eye. The two struts 22, 23 are connected to each other by an additional auxiliary strut for bracing purposes between the front body-side bearing 13 and the rear body-side bearing 14. A spring cup 19 is formed behind the intersection of the struts 22, 23 referring to the longitudinal direction of the vehicle x. This spring cup 19 serves to receive a lower end of a spring 11 of the wheel suspension.

At the hub carrier end of the cross member 23, a receptacle for a hub carrier bearing 15 is formed. In the rear area of the wheel-guiding link 4, the longitudinal strut 22 running in the longitudinal direction of the vehicle x forms a receptacle for a shock absorber bearing 16 laterally opposite from the spring cup 19. As will be explained in more detail below, the holder for the hub carrier bearing 15 and the holder for the damper bearing 16 are part of a first connection area 20 and a second connection area 21 for connecting or coupling the hub carrier 2 to the wheel-guiding link.

Figure 5:
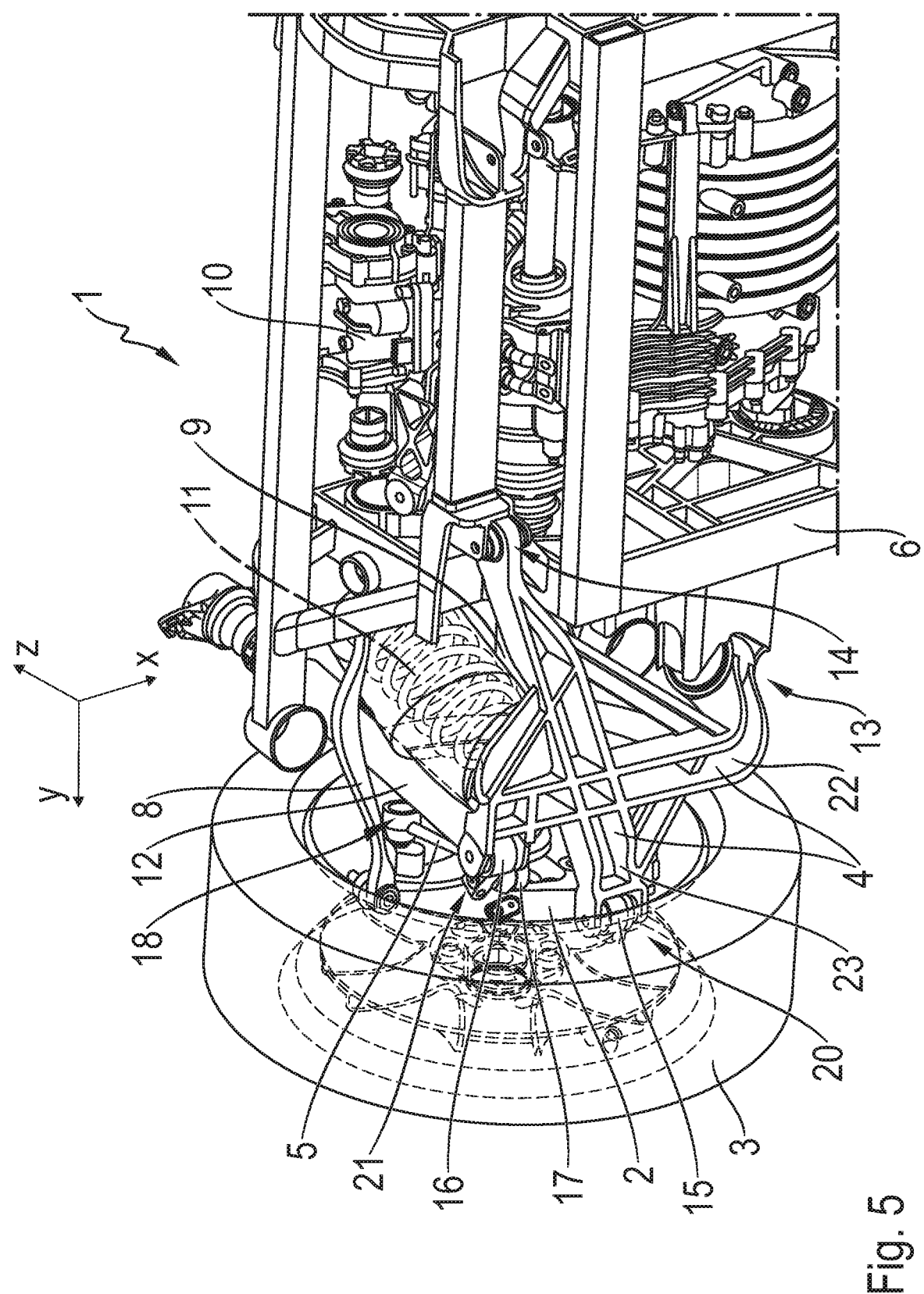
FIG. 5 shows an oblique view of the suspension from below.
Figure 6:
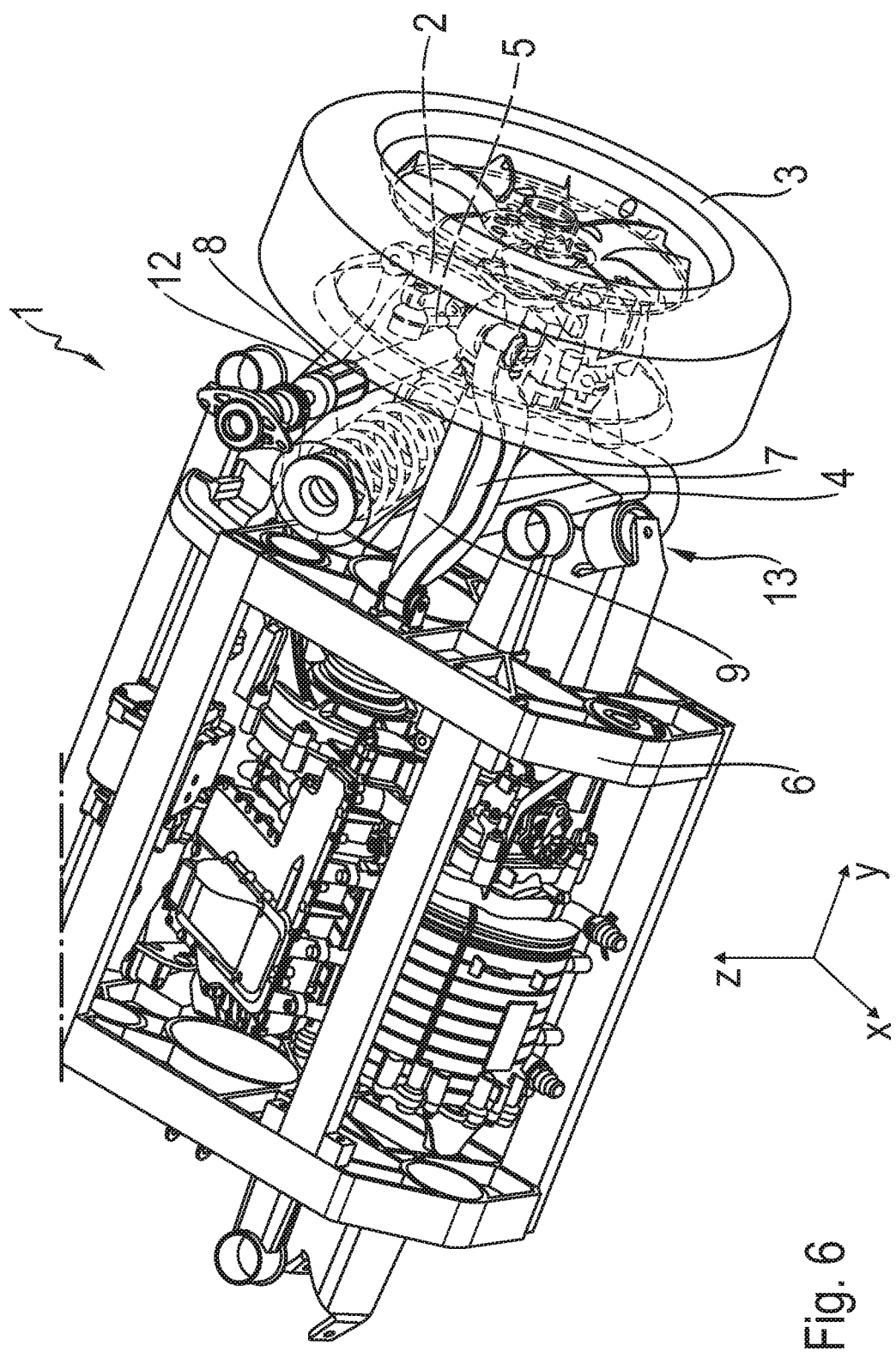
FIG. 6 shows an oblique view of the suspension from above and the rear.

As is best seen in FIG. 5, the wheel-guiding link 4 is pivotally connected to the body 6 via the front body-side bearing 13 and the rear body-side bearing 14. Thus, the wheel-guiding link 4 has an oblique axis of rotation relative to the longitudinal axis of the vehicle x.

As is best seen in FIG. 4 in conjunction with FIG. 1, an imaginary line connecting the front body-side bearing 13 and the rear body-side bearing 14 extends approximately in parallel to another imaginary line connecting the hub carrier bearing 15 and the damper bearing 16 also held by the wheel-guiding link 4. The wheel-guiding link 4 can also be described as a trapezoidal link.

With reference to FIG. 5, it can be seen that the wheel-guiding link 4 is mounted relative to the cross member 6 about a swivel axis extending through the front body-side bearing 13 and the rear body-side bearing 14 to permit swivel motions. By means of a spring 11 mounted to the spring cup 19 of the wheel-guiding link 4, the upper end of which spring is supported relative to the body of the vehicle (not shown in detail), the wheel-guiding link 4 is sprung relative to the vehicle body. A damper 12 is used to dampen the spring movements of the wheel-guiding link 4. The damper 12 extends, as can be seen for example in FIGS. 2, 3, 5, mainly in the vertical direction of the vehicle z. At its lower end, the damper 12 is pivotally connected to the rear end of the wheel-guiding link 4 via a damper bearing 16. A body-side end of the damper is supported by the vehicle body (not shown in detail for illustration purposes). In relation to the swivel axis of the wheel-guiding link 4 extending through the bearing points 13 and 14, the spring 11 is arranged closer to the swivel axis than the damper 12.

The hub carrier 2 holding the wheel 3 is connected to the wheel-guiding link 4 or coupled thereto according to the invention in a particular manner explained below. To enable the steerability of the wheel 3, the hub carrier 2 can be swiveled about a steering axis relative to the wheel-guiding link 4. For this purpose, the hub carrier 2 is directly connected to the wheel-guiding link 4 in a first connection area 20, namely via a hub carrier bearing 15 designed as a ball joint. This ball joint has three degrees of freedom, the hub carrier 2 can, compared to the wheel-guiding link 4, thus basically be swiveled about all three axes of rotation. The connection between the hub carrier 2 and, 4 via the hub carrier bearing 15 is located in a lower link level.

To determine the camber angle of the wheel 3, the wheel suspension 1 further comprises a camber arm 7, which is arranged in a comparatively higher link level. The camber arm 7, visible in FIGS. 1, 2, 3 and 6, is an approximately c-shaped component, which extends largely in the transverse direction of the vehicle y. On the body end, the camber arm 7 is pivotally connected to the hub carrier end of the cross member 6, the camber arm 7 is connected to an upwardly projecting arm of the hub carrier 2. In this way, the hub carrier 2 is connected to the cross member 6 in a lower link level by the wheel-guiding link 4 and in an upper link level by the camber arm 7. The hub carrier 2 in this case can be swiveled about a steering axis relative to the wheel-guiding link 4, which passes through the hub carrier bearing 15 and through a joint connecting the camber arm 7 to the hub carrier 2. Depending on the compression state of the wheel-guiding link 4, the steering axle formed in this way can change its relative position with respect to the cross member 6 or the vehicle body.

In order to support torques acting on the hub carrier 2 about the wheel axis, the hub carrier 2 is indirectly coupled to the wheel-guiding link 4 in a second connection area 21—in addition to the direct connection in the first connection area 20. This indirect coupling is performed by an integral link 5 articulated to the wheel 2, which link is coupled to the wheel-guiding link 4 in a special way, namely indirectly. The integral link 5 is an elongated link component, which, in the unsteered state of the wheel 3, is oriented largely in the vertical direction of the vehicle z. The integral link 5 is pivotally connected to a rearward projecting link of the hub carrier 2 via an upper connection 18, cf. FIGS. 3 and 5. The integral link 5 is pivotally connected to the damper 12 via a lower connection 17.

Figure 2:
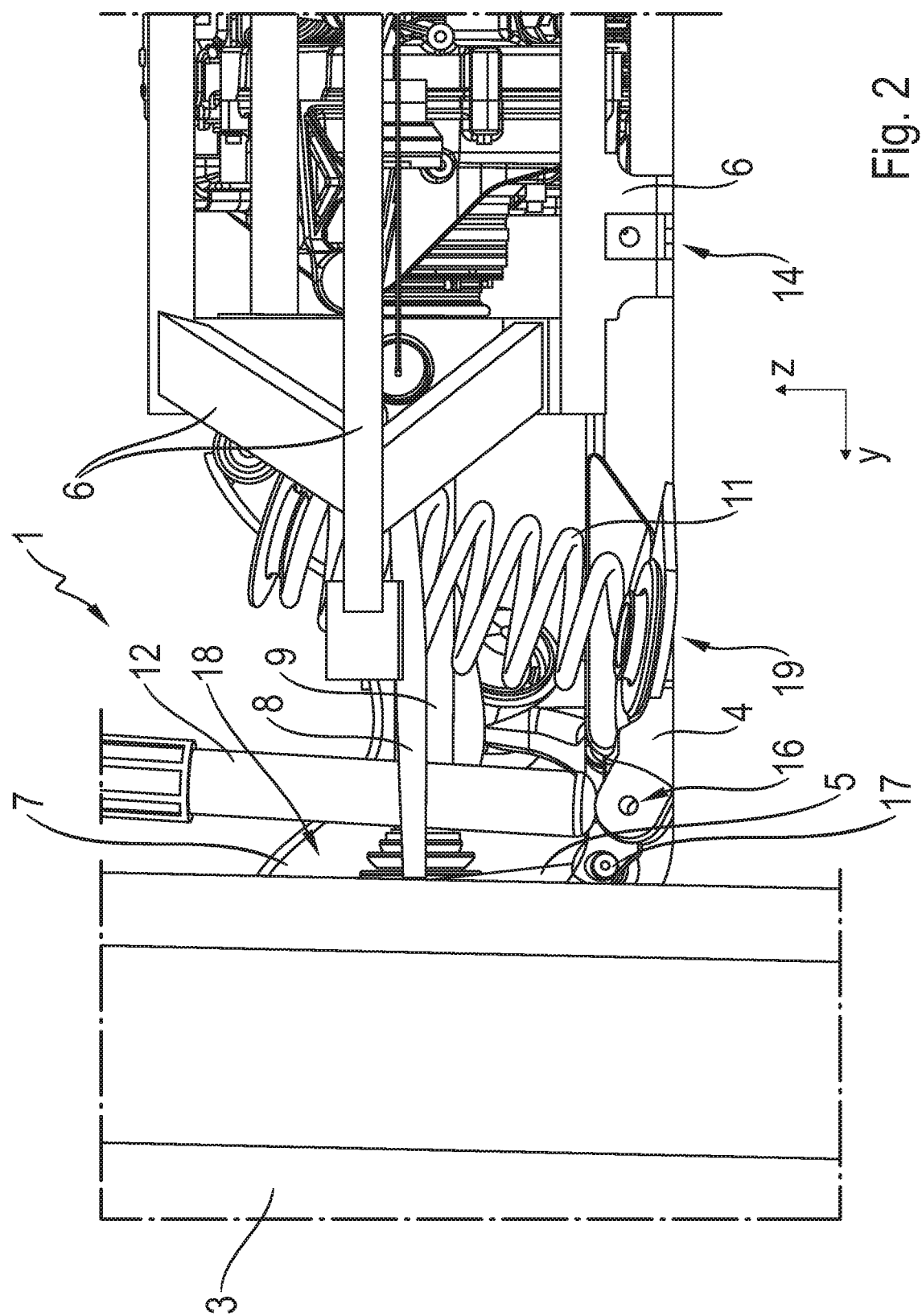
FIG. 2 shows a rear view of the wheel suspension
Figure 3:
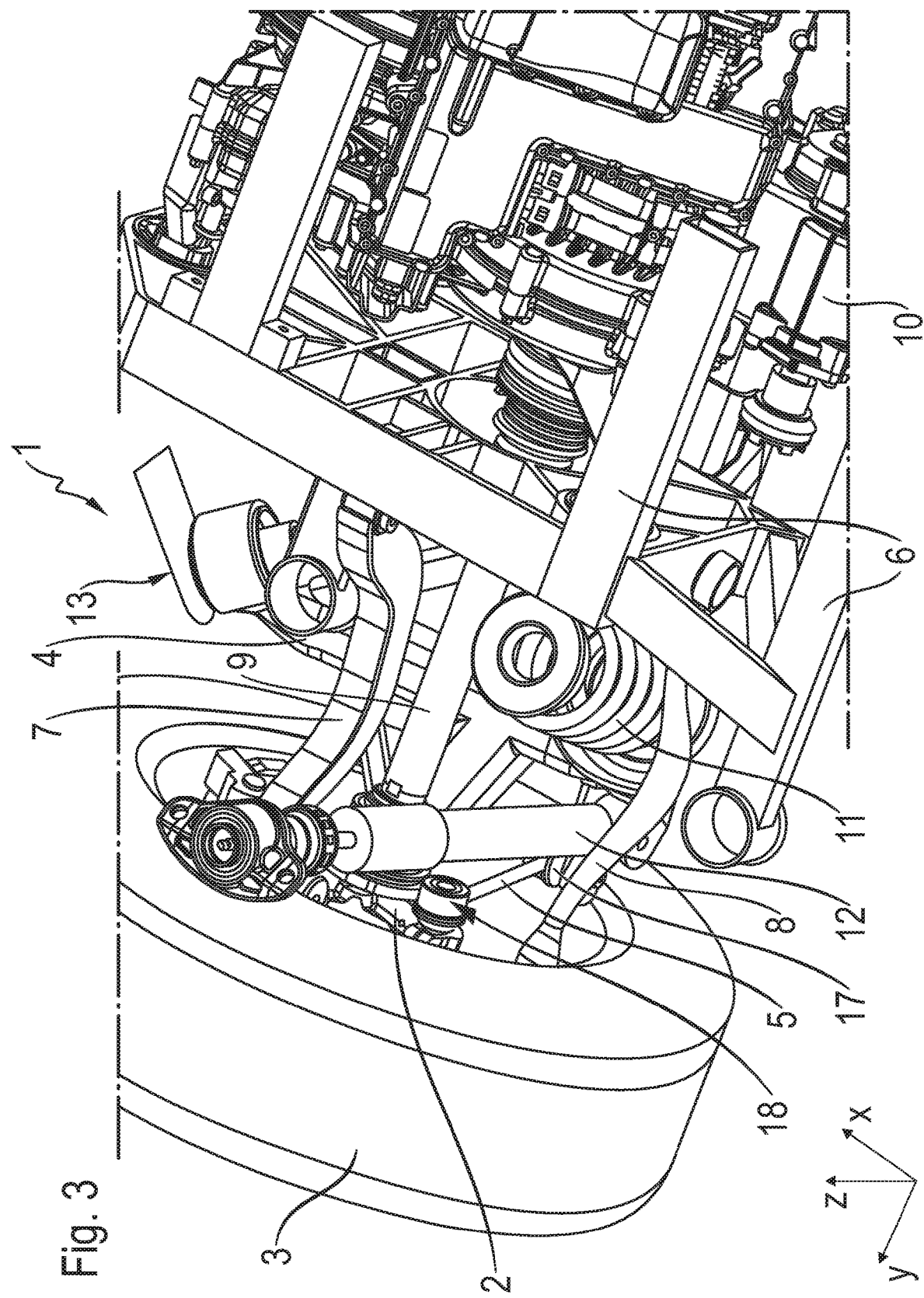
FIG. 3 shows an oblique view of the suspension from above and the rear.

With reference to FIG. 2, it can be seen that the lower connection 17 of the integral link 5 is laterally arranged on the damper 12 next to the damper bearing 16. The coupling area between integral link 5 and damper 12 resulting due to the lower connection 17 is thus spaced further apart from the vehicle center (relative to the transverse direction of the vehicle y) than the coupling formed by the damper bearing 16 for articulated connection of the damper 12 to the wheel-guiding link 4. In this way, the integral link 5 is not directly coupled but connected to the wheel-guiding link 4 with the interposition of the damper 12 pivotally connected to the wheel-guiding link 4.

The effect of this connection is initially that the bearing mount for the damper bearing 16 can be used as a coupling between the wheel-guiding link 4 and the integral link 5 in addition to being the damper support. This simplifies the design of the wheel-guiding link 4. In addition, this design permits the integral link 5, the damper 12 and the spring 11 to be arranged approximately in a line running in the transverse direction of the vehicle y in plan view of the wheel suspension 1 (see FIG. 1). This results in an advantageous utilization of installation space, in particular a drive shaft 9 driving the wheel 3, which shaft extends substantially in the transverse direction of the vehicle y, can pass the integral link 5, damper 12, spring 11 without colliding with the latter.

Another effect of the connection of the integral link 5 to the damper 12 according to the invention is that the kinematic influence of the damper 12 can be advantageously used. Namely, the position of the lower connection 17 of the integral link 5 is influenced both by the compression state of the wheel-guiding link 4 and by an inclination angle of the damper 12 with respect to the x-z plane. This kinematic influence is advantageous in that the hub carrier 2 largely maintains its steering angle independently of the compression state of the wheel-guiding link 4.

The wheel suspension 1 shown is a steerable wheel suspension. For this purpose, the first connection area 20, which is provided via the hub carrier bearing 15, and the second connection area 21, which is provided via the integral link 5 and an area of the damper 12, are spaced apart in the longitudinal direction of the vehicle x. In this case, the first connection area 20 is located in front of the center of the wheel 3 with respect to the longitudinal direction of the vehicle x, while the second connection area 21 is arranged behind the center of the wheel 3. Please note that, deviating from the exemplary embodiment illustrated and described here, the first connection area with respect to the longitudinal direction of the vehicle x can also be arranged near the center of the wheel or even behind the center of the wheel.

For steering the wheel 3, the hub carrier 2, as best seen in FIG. 5, is pivotally connected to a hub carrier end of a tie link 8 by a rearward projecting arm. The tie link 8 is designed as a mainly elongate member and extends mainly in the transverse direction of the vehicle y. As indicated for example in FIG. 1, the tie link 8 is operatively connected to a steering actuator centrally arranged on the cross member 6. To perform active steering movements, the tie link 8 is moved in the transverse direction of the vehicle y by means of the steering actuator 10, the transverse movement is transmitted to the rear area of the hub carrier 2 via the tie link 8. As a result of this transverse movement, a swiveling of the hub carrier 2 about the steering axis (described above) is effected.

Please note that the wheel suspension may alternatively (not shown in the figures) be equipped with a passive steering. In this case, the steering means provided according to the invention is in each case designed as a steering link. Such a steering link is also connected to a rearward projecting link of the hub carrier at the hub carrier end (as in the case of active steering the tie link 8). The steering link is designed as a largely elongated component and an articulated connection to the vehicle at the cross member end largely extends in the transverse direction of the vehicle. A steering actuator is omitted in this case; the wheel travel provides the influence.

In the exemplary embodiment of the invention explained with reference to FIGS. 1 to 6, the indirect coupling according to the invention between the hub carrier 2 and the wheel-guiding link 4 is designed such that the damper 12 is pivotally connected to the wheel-guiding link 4 by means of the bearing 16 and the upper end of the integral link 5 is connected to the hub carrier 2 by means of the joint 18.

Figure 7:
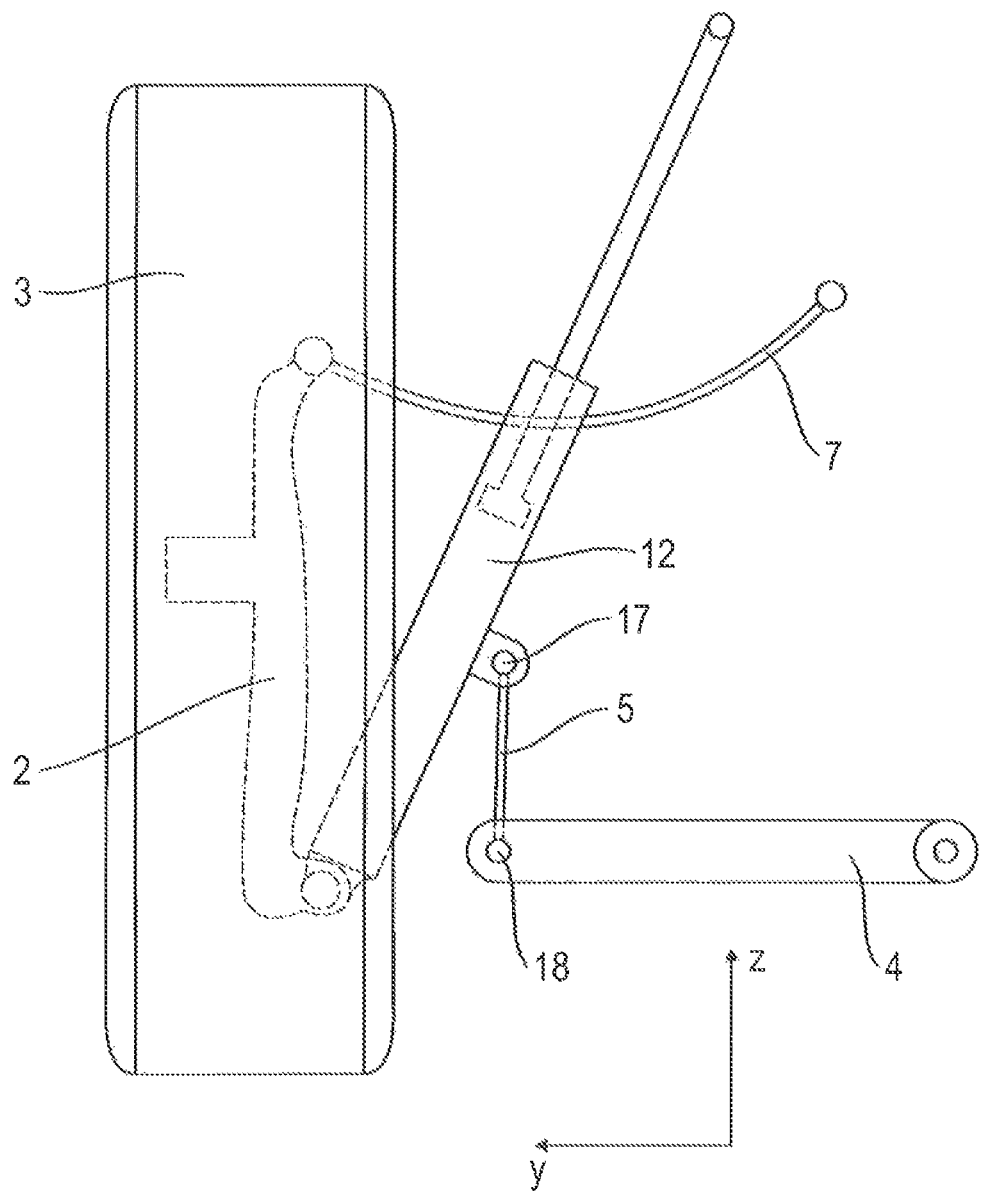
FIG. 7 shows a schematic view from the rear of a suspension according to another exemplary embodiment.

As an alternative to this design, FIG. 7 schematically shows a rear view of another embodiment of the invention. Again, it is a wheel suspension for a motor vehicle. It can basically have the same features as described with reference to the previous figures. Reference is therefore made to the explanations there. Deviating therefrom, the embodiment shown in FIG. 7, however, includes a kinematic reversal with respect to the indirect coupling between the hub carrier 2 and the wheel-guiding link 4. Thus, a kinematic chain consisting of an integral link 5 and an articulated chassis member 12 (in the form of a damper) is again used for indirect coupling. However, this kinematic chain has been reversed, here the damper 12 is pivotally connected to the hub carrier 2 and the integral link 5 is connected to the wheel-guiding link 4 by means of a joint 18. The integral link 5 and the damper 12 are pivotally connected to each other via the joint 17.

REFERENCE NUMERALS

1 wheel suspension
2 hub carrier
3 wheel
4 link, arm
5 integral link
6 cross member/body
7 camber arm
8 tie link
9 drive shaft
10 steering actuator
11 spring
12 damper
13 front body-side bearing
14 rear body-side bearing
15 hub carrier bearing
16 damper bearing
17 first connection integral link
18 second connection integral link
19 spring cup
20 first connection area
21 second connection area
22 longitudinal strut
23 cross-brace
x longitudinal direction of the vehicle
y transverse direction of the vehicle
z vertical direction of the vehicle

The invention claimed is:
1. A wheel suspension for a motor vehicle, the wheel suspension comprising:
   a hub carrier for holding a wheel;
   a wheel-guiding link having a body-side that is pivotally connected to a body of the vehicle, and the wheel-guiding link having first and second receptacles that are part of first and second connection areas, respectively, and the wheel-guiding link articulately connecting the hub carrier to the body;

a steering means being pivotally connected to the hub carrier for steering the wheel;

an elongate chassis element having a body-side end that is connected to the body;

an integral link is pivotally connected to the chassis element and extends in a substantially vertical direction of the vehicle in an unsteered position of the wheel;

the hub carrier and the wheel-guiding link, for steering the wheel, being pivotally connected to each other such that the hub carrier is pivotable about a steering axis relative to the wheel-guiding link;

the hub carrier being directly connected to the first receptacle of the wheel-guiding link in the first connection area; and the hub carrier being indirectly coupled, via the integral link and the chassis element, to the second receptacle of the wheel-guiding link in the second connection area.

2. The wheel suspension according to claim 1, wherein a first end of the integral link is connected to the chassis element by a first joint, and either:

an opposite end of the chassis element, that is opposite the body-side end, is pivotally connected to the second receptacle of the wheel-guiding link and a second end of the integral link is connected to the hub carrier by a second articulation, or the opposite end of the chassis element is pivotally connected to the hub carrier and the second end of the integral link is connected to the second receptacle of the wheel-guiding link by a second joint.

3. The wheel suspension according to claim 1, wherein the chassis element is either a damper or a spring-damper system that is connected to the body, at the body-side end thereof, for damping vibration of the wheel.

4. The wheel suspension according to claim 1, wherein a vertically lower end of the integral link is pivotally connected to a lower end of the chassis element that is opposite the body-side end by a first joint, which is spaced further apart from a center of the vehicle than a bearing that pivotally connects the lower end of the chassis element to the second receptacle of the wheel-guiding link.

5. The wheel suspension according to claim 1, wherein a lower end of the elongate chassis element, that is opposite the body-side end, is pivotally connected to the second receptacle of the wheel-guiding link, and the chassis element extends substantially in the vertical direction of the vehicle.

6. The wheel suspension according to claim 1, wherein the first and the second connection areas are spaced apart from one another in a longitudinal direction of the vehicle.

7. The wheel suspension according to claim 6, wherein, in the longitudinal direction of the vehicle, one of the first and the second connection areas is located in front of a wheel center and the other one of the first and the second connection areas is located behind the wheel center.

8. The wheel suspension according to claim 1, wherein an upper end of the integral link is pivotally connected, via an upper second joint, to a link of the hub carrier that projects rearward relative to a longitudinal direction of the vehicle, and a lower end of the integral link is pivotally connected, via a lower first joint, to a lower end of the chassis element.

9. The wheel suspension according to claim 1, wherein, the body-side of the wheel-guiding link is pivotally attached to the body by a front bearing and a rear bearing such that the wheel-guiding link pivots relative to the body about an axis of rotation that is inclined in relation to a longitudinal axis of the vehicle.

10. The wheel suspension according to claim 1, wherein the first receptacle has a hub carrier bearing and the second receptacle has a damper bearing.

11. The wheel suspension according to claim 1, wherein the wheel-guiding link is arranged in a lower link plane, in relation to the substantially vertical direction of the vehicle, and a camber arm connecting the hub carrier to the body is arranged in another link plane, above the lower link plane.

12. The wheel suspension according to claim 1, wherein the steering means is designed either for passive steering via a wheel travel as a steering link or for active steering via a steering actuator as a tie link.

13. The wheel suspension according to claim 1, wherein, in a plan view from the substantially vertical direction of the vehicle, the integral link, the chassis element and a spring assigned to the wheel-guiding link are arranged approximately along a line extending in a transverse direction of the vehicle, and in relation to a longitudinal direction of the vehicle, the integral link, the chassis element and the spring are arranged between the steering means and a camber arm that connects the hub carrier to the body.

14. The wheel suspension according to claim 13, wherein the wheel is drivable via a shaft extending substantially in a transverse direction of the vehicle and in relation to the longitudinal direction of the vehicle, and the drive shaft is arranged between the steering means and the camber arm.

* * * * *